(12) United States Patent
Burd

(10) Patent No.: US 9,376,985 B2
(45) Date of Patent: Jun. 28, 2016

(54) OVATE SWIRLER ASSEMBLY FOR COMBUSTORS

(71) Applicant: UNITED TECHNOLOGIES CORPORATION, Farmington, CT (US)

(72) Inventor: Steven W. Burd, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 657 days.

(21) Appl. No.: 13/717,203

(22) Filed: Dec. 17, 2012

(65) Prior Publication Data

US 2014/0165578 A1    Jun. 19, 2014

(51) Int. Cl.
*F23R 3/28*   (2006.01)
*F02G 3/00*   (2006.01)
*F23R 3/14*   (2006.01)

(52) U.S. Cl.
CPC ... *F02G 3/00* (2013.01); *F23R 3/14* (2013.01); *F23R 3/28* (2013.01); *F23R 3/286* (2013.01); *Y02T 50/675* (2013.01); *Y10T 137/2087* (2015.04)

(58) Field of Classification Search
CPC ............... F23R 3/10; F23R 3/12; F23R 3/14; F23R 3/286; F23R 3/28; F05D 2260/14
See application file for complete search history.

(56) References Cited

U.S. PATENT DOCUMENTS

| | | | | |
|---|---|---|---|---|
| 4,218,020 A * | 8/1980 | Reider | | F23R 3/14 239/406 |
| 4,288,980 A | 9/1981 | Ernst | | |
| 4,584,834 A * | 4/1986 | Koshoffer | | F23R 3/04 239/403 |
| 4,763,482 A | 8/1988 | Wehner | | |
| 5,117,624 A * | 6/1992 | Roberts, Jr. | | F23R 3/283 60/740 |
| 5,267,442 A * | 12/1993 | Clark | | F23D 11/007 60/748 |
| 5,351,475 A * | 10/1994 | Ansart | | F23R 3/50 60/746 |
| 5,596,873 A * | 1/1997 | Joshi | | F23R 3/286 60/738 |
| 5,966,937 A * | 10/1999 | Graves | | F23C 7/004 239/400 |
| 5,987,889 A * | 11/1999 | Graves | | F23C 7/004 60/746 |
| 6,119,459 A | 9/2000 | Gomez et al. | | |
| 6,161,387 A * | 12/2000 | Green | | F23R 3/343 60/742 |
| 6,581,386 B2 | 6/2003 | Young et al. | | |
| 6,772,594 B2 * | 8/2004 | Nishida | | F23R 3/002 60/737 |
| 7,836,699 B2 * | 11/2010 | Graves | | F23C 7/004 60/737 |
| 8,113,000 B2 * | 2/2012 | Laster | | F23R 3/14 60/39.11 |
| 2008/0163627 A1 | 7/2008 | Elkady et al. | | |
| 2012/0111013 A1* | 5/2012 | Parsania | | F23C 7/004 60/737 |
| 2014/0157781 A1* | 6/2014 | Moran | | F23R 3/14 60/746 |
| 2014/0165585 A1* | 6/2014 | Burd | | F23R 3/28 60/776 |

OTHER PUBLICATIONS

International Search Report and Written Opinion for related International Application No. PCT/US2013/068720; report dated Mar. 14, 2014.

* cited by examiner

*Primary Examiner* — Phutthiwat Wongwian
*Assistant Examiner* — Jason H Duger
(74) *Attorney, Agent, or Firm* — Cantor Colburn LLP

(57) ABSTRACT

A swirler includes an inner shroud positioned radially inside an outer shroud. At least one of the outer shroud and inner shroud has a major diameter and a minor diameter, the major diameter being greater than the minor diameter, the major and minor diameters defining an ovate shape. The swirler further includes a plurality of vanes extending between the inner and outer shrouds.

18 Claims, 5 Drawing Sheets

OVATE SWIRLER ASSEMBLY FOR COMBUSTORS

FIELD OF THE DISCLOSURE

The present disclosure generally relates to gas turbine engines and, more specifically, to a swirler of a combustor of a gas turbine engine.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and a compressor, such as a dual-spool compressor, rotate to draw in and compress the ambient air. The compressed air is then forced into the combustor, where a portion of the air is used to cool the combustor, while the rest is mixed with a fuel and ignited.

Typically, an igniter generates an electrical spark to ignite the air-fuel mixture. The products of the combustion and the remains of the air-fuel mixture then travel out of the combustor through a turbine as exhaust. The turbine, also a dual-spool configuration, is forced to rotate by the exhaust. The turbine, the compressor, and the fan are connected by an engine shaft, and in this case of a dual-spool configuration a pair of concentrically mounted engine shafts, running through the center of the engine. Thus, as the turbine rotates from the exhaust, the fan and the compressor rotate to bring in and compress new air. Once started, it can thereby be seen that this process is self-sustaining.

Combustors for gas turbine engines typically have a shell and a liner with an air passage defined therebetween. In an annular combustor an outer liner and an inner liner cooperate to define an annular combustion chamber between the inner and outer liners. In such a combustor, there is at least one igniter for igniting the air-fuel mixture. In some combustor designs, the liners may be segmented into panels.

The combustor further has a combustor bulkhead at a front end of the chamber extending from the outer shell to the inner shell. At least one fuel injector extends through this combustor bulkhead and into the combustion chamber to release the fuel. A swirler is generally positioned around each fuel injector to create turbulence in the combustion chamber and mix the combustion air and the fuel before the mixture is combusted.

In prior art designs, the swirler, including a housing and vanes, has a circular projection, that is, all radii of the swirler are equal. While effective, this circular projection may not adequately mix the air and the fuel in all situations, which may create difficulties in achieving the balance of emission, operability, and durability of the combustor and turbine. The round circular nature of the swirler may create further difficulties when utilized with annular combustors. Thus, a new swirler design is needed to achieve better mixing of the air and fuel, particularly with an annular combustor.

SUMMARY OF THE DISCLOSURE

In accordance with one aspect of the disclosure, a swirler is disclosed. The swirler may include an outer shroud and inner shroud. The inner shroud may be positioned radially inside the outer shroud. At least one of the outer shroud and inner shroud may have a major diameter greater than that of a minor diameter such that the shrouds define an ovate shape. The swirler may further include a plurality of vanes which may be positioned between the inner and outer shrouds.

In a refinement, the vanes may be positioned between the inner and outer shrouds in an ovate shape.

In another refinement, both the inner and outer shrouds may have an ovate shape.

In another refinement, the swirler may be ovate shaped at a proximal end, circular shaped at a distal end, and the inner and outer shrouds may transition from an ovate shape at the proximal end to a circular shape at the distal end.

In yet another refinement, the swirler may be ovate shaped at a distal end, circular shaped at a proximal end, and the inner and outer shrouds may transition from a circular shape at the proximal end to an ovate shape at the distal end.

In yet another refinement, a second swirler may be positioned around the first swirler.

In a further refinement, the second swirler may have an ovate shape.

In still another refinement, the swirler may be a component of a swirler assembly. The swirler assembly may include a plurality of swirlers which may have ovate, circular, or a mixture of ovate and circular shapes.

In accordance with another aspect of the disclosure, a gas turbine engine having a compressor, a combustor, and a turbine axially aligned is disclosed. The turbine and compressor may be connected by a rotatable shaft. The combustor may have at least one swirler positioned through a forward bulkhead. Each swirler may include a an outer shroud and inner shroud. The inner shroud may be positioned radially inside the outer shroud. At least one of the inner and outer shrouds may have ovate shapes. The swirler may further include a plurality of vanes positioned between the inner and outer shrouds.

In a refinement, the vanes may be positioned between the inner and outer shrouds in an ovate shape.

In another refinement, both the inner and outer shrouds may have an ovate shape.

In another refinement, the swirler may be ovate shaped at a proximal end, circular shaped at a distal end, and the inner and outer shrouds may transition from an ovate shape at the proximal end to a circular shape at the distal end.

In another refinement, the swirler may be ovate shaped at a distal end, circular shaped at a proximal end, and the inner and outer shrouds may transition from a circular shape at the proximal end to an ovate shape at the distal end.

In yet another refinement, the combustor may have an annular shape and the radial height of the swirler with respect to the combustor may be greater than the circumferential width of the swirler with respect to the combustor.

In a further refinement, the swirler shape may be symmetric about a radial line of the forward bulkhead.

In yet another refinement, a second swirler may radially surround the first swirler and both swirlers may be ovate shaped.

In yet another refinement, the swirler may be a component of a swirler assembly which may include a plurality of swirlers. Each swirler may have an ovate shape, a circular shape, or a mixture of ovate and circular shapes.

In yet another aspect of the disclosure, a method of mixing air and fuel with an ovate swirler is disclosed. The method may include injecting fuel into a housing of the swirler by a fuel injector and creating a mixing turbulence with air flowing through a plurality of air passages between a plurality of vanes disposed in the housing of the swirler. The vanes may be disposed around the fuel injector in an ovate shape.

In a refinement, the method may further include providing a preferential premixing of the air and fuel with the housing having an ovate shaped proximal end.

In another refinement, the method may further include dispersing the air-fuel mixture into a combustion chamber in a preferential air-fuel flow distribution by the housing having an ovate shaped distal end.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
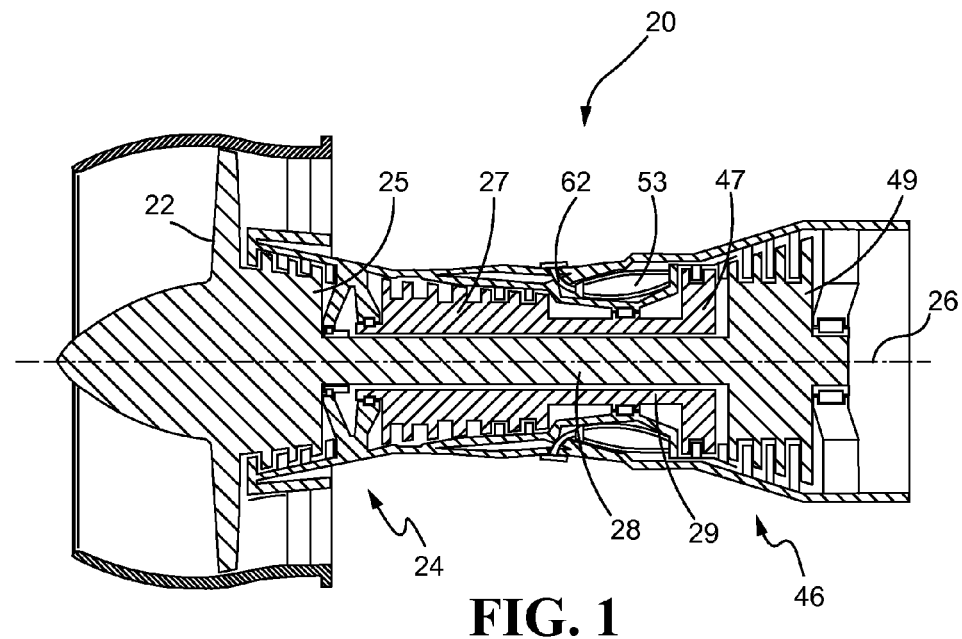
FIG. 1 is a cross-sectional view of a gas turbine engine constructed in accordance with the present disclosure.

Referring now to the drawings, and with specific reference to FIG. 1, a gas turbine engine, depicted as a turbofan engine, is disclosed and generally referred to by numeral 20. The engine 20 includes a plurality of axially aligned components beginning with a fan 22 and a compressor section 24. The fan 22 draws in ambient air by rotating around a central axis 26 on a first shaft 28, which extends through the engine 20 along the central axis 26. The compressor section 24 pictured is a dual-spool compressor, however other compressors are possible, having a low-pressure compressor 25 and a high-pressure compressor 27. The low-pressure compressor 25 compresses the ambient air by rotating on the rotating shaft 28 around the central axis 26 to create compressed air 32. The compressed air 32 flows to the high-pressure compressor 27 which rotates on a second shaft 29 concentrically mounted around the first shaft 28 to further compress the compressed air 32.

The compressed air 32 then flows from the compressor section 24 to a combustor 34 where the air 32 is split to be used as combustion air 36 and cooling air 38. Combusting the combustion air 36 with a fuel 40 in the combustor 34 creates an exhaust 42, which exits the combustor 34 at a rear end 44 and expands into the turbine section 46, pictured as a dual-spool turbine having a high-pressure turbine 47 and a low-pressure turbine 49. The expanding exhaust 42 causes the high-pressure turbine 47 to rotate on the second shaft 29 and the low-pressure turbine 49 to rotate on the first shaft 28, both around the central axis 26, and thereby drives the rotation of the corresponding compressors 25 and 27. Thus, new air is drawn into the engine 20 as the exhaust 42 exits the engine 20.

Figure 2:
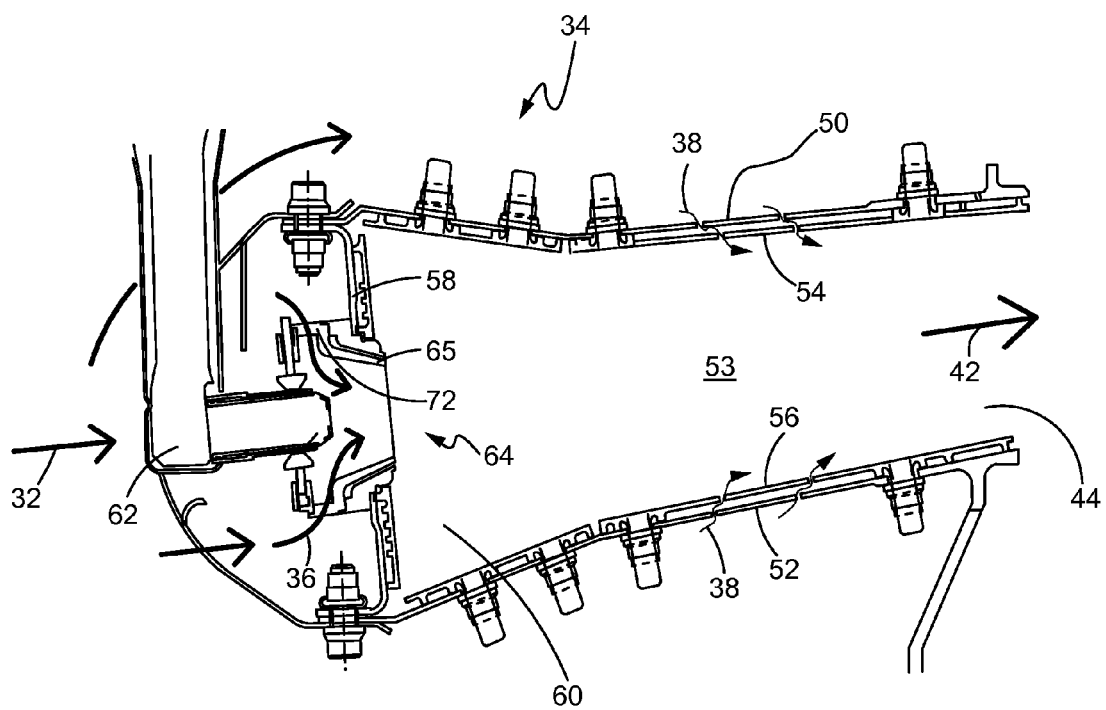
FIG. 2 is a cross-sectional view of an annular combustor constructed in accordance with the present disclosure.

The combustor 34 may be annular in shape, as shown in FIG. 2, and positioned around the central axis 26. The annular combustor 34 has an outer shell 50 and an inner shell 52 radially interior to the outer shell 50, which cooperate to define a combustion chamber 53 therebetween. Optionally, an outer liner 54 may be positioned radially inwards from the outer shell 50 and an inner liner 56 may also be positioned radially outwards from the inner shell 52. The liners 54 and 56 may act as a thermal barrier to protect the shells 50 and 52, respectively, from the high temperatures in the combustion chamber 53. A combustor bulkhead 58 may be of an annular shape and extend from the inner shell 52 to the outer shell 50 to define the front end 60 of the combustion chamber 53.

Figure 3:
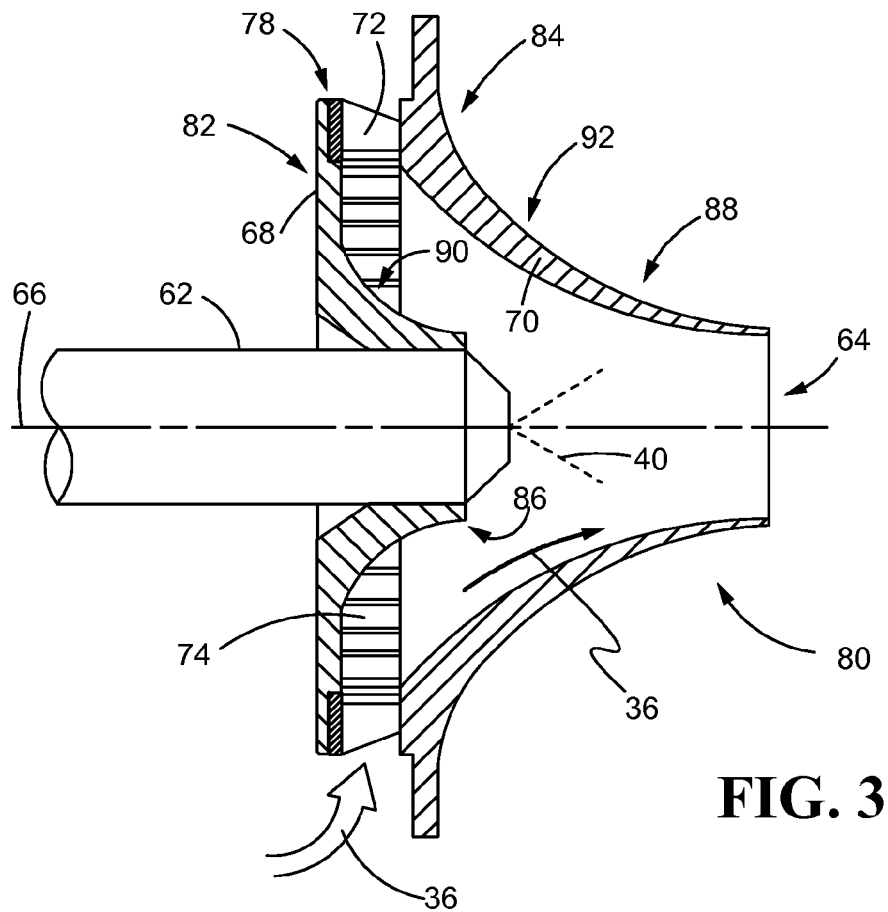
FIG. 3 is a cross-sectional view, perpendicular to the centerline of the combustor bulkhead, of a combustor forward bulkhead, swirler and fuel injector constructed in accordance with the present disclosure.

At least one fuel injector 62 may extend through the bulkhead 58. The fuel injector 62 receives a flow of fuel 40 disperses that fuel 40 into the combustion chamber 53 to be mixed and combusted with the combustion air 36. At least one swirler 64 is positioned around a swirler axis 66 extending axially through each fuel injector 62, as seen in FIG. 3, to allow combustion air 36 to enter the combustion chamber 53 and mix with the fuel 40. The swirler 64 has a swirler housing 65 which includes an inner shroud 68 positioned immediately around the fuel injector 62 and an outer shroud 70 positioned radially outward from the inner shroud 68. A plurality of swirler vanes 72 are positioned between the shrouds 68 and 70 such that combustion air 36 may enter into the combustion chamber 53 through a plurality of air passages 74 between the swirler vanes 72.

Figure 4:
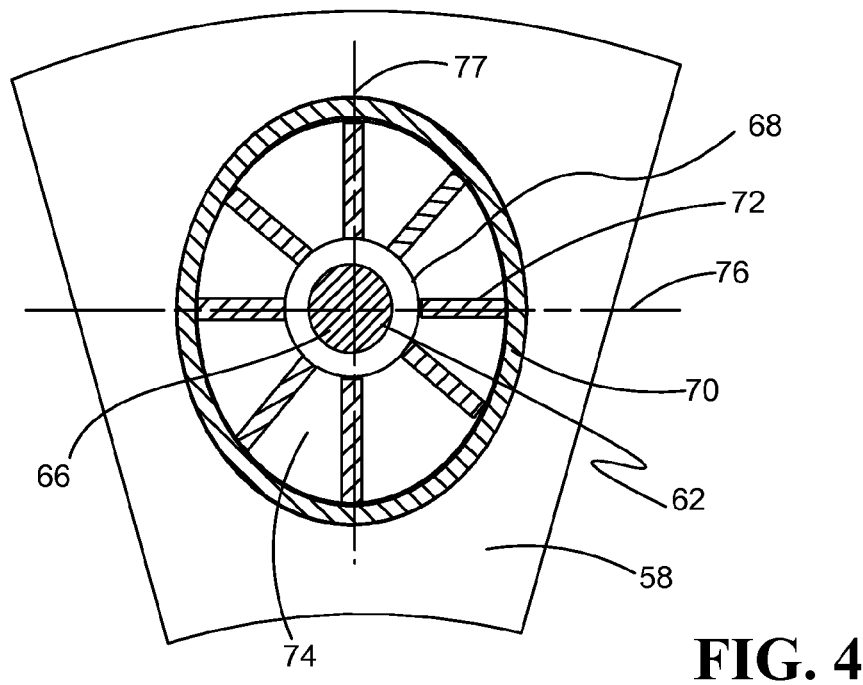
FIG. 4 is a front view of a combustor forward bulkhead incorporating a swirler constructed in accordance with the present disclosure.

As shown in FIG. 4, there may be a centerline 76 along the bulkhead 58 parallel to the shells 50 and 52 of the combustor 34 and extending through a circumferential diameter of each swirler 64. The swirler 64 may be ovate shaped, such that the shrouds 68 and 70 and the swirler vanes 72 have a radial diameter greater than a circumferential diameter, with respect to the central axis 26, and are symmetric about a radial line 77 extending from the inner shell 50 to the outer shell 52 perpendicular to the centerline 76. However, this is only one exemplary embodiment, and any ovate shape is possible with any symmetry or no symmetry.

The adjective "ovate" used herein is defined as a roughly circular shape having a radial diameter greater than a circumferential diameter with respect to the central axis 26, as opposed to a circle which has an equal diameter in all directions. It is therefore intended that a swirler or swirler component having a major diameter extending in a radial direction about radial line 77 greater than a minor diameter extending in a circumferential direction about centerline 76 be considered to have an ovate shape. The shapes in the respective quadrants formed by lines 76 and 77 need not be symmetric about lines 76 and/or 77 nor common in geometry.

Figure 5:
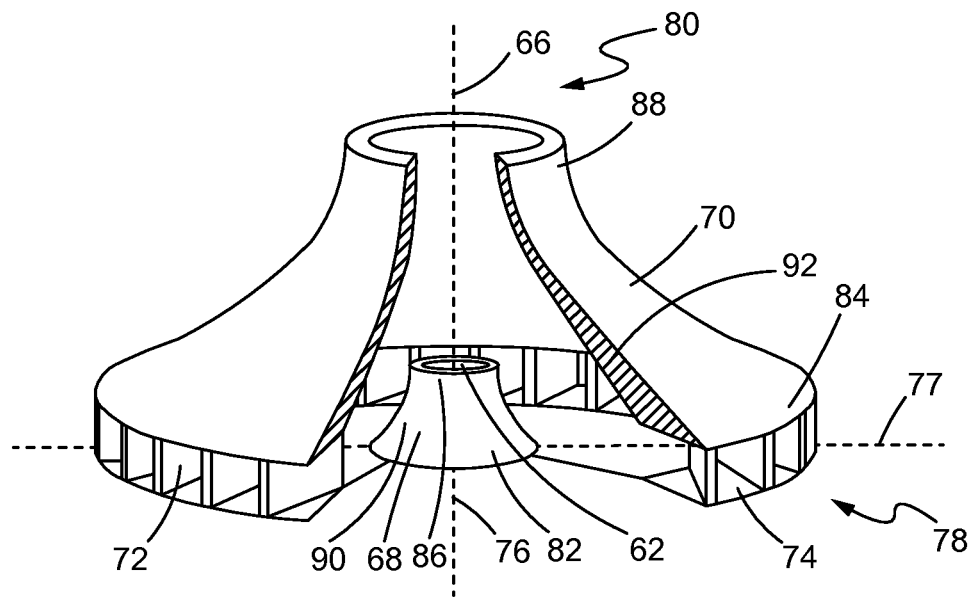
FIG. 5 is a perspective, partial cut-away, view of a swirler constructed in accordance with the present disclosure and detailing an ovate shape of a proximal end of the swirler.

Alternately, the swirler 64 may incorporate both circular and ovate shapes. For example, a proximal end 78 of the swirler 64 may be ovate as described above, while a distal end 80 of the swirler 64 may be circular, as in FIG. 5. In this embodiment, the swirler vanes 72 and a proximal end 82 and 84 of the shrouds 68 and 70, respectively, have an ovate shape; while a distal end 86 and 88 of the shrouds 68 and 70, respectively, have a circular shape. The shrouds 68 and 70 may include a transitional wall 90 and 92, respectively, which smoothly extends from the ovate proximal end 82 and 84 to the circular distal end 86 and 88, respectively.

Figure 6:
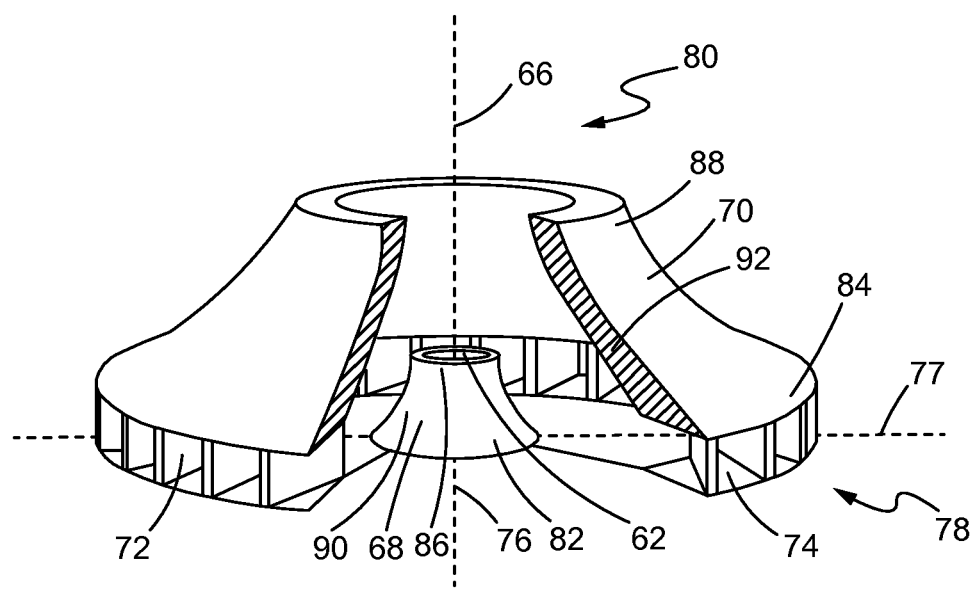
FIG. 6 is a perspective, partial cut-away, view of a swirler constructed in accordance with the present disclosure and detailing an ovate shape of a distal end of the swirler.

In another alternate embodiment, shown in FIG. 6, the distal end 80 may be ovate while the proximal end 78 may be circular. In this embodiment, the swirler vanes 72 and proximal ends 82 and 84 have a circular shape, while the distal ends 86 and 88 have an ovate shape. The transitional walls 90 and 92 smoothly extend from the circular proximal ends 82 and 84 to the ovate distal ends 86 and 88.

The ovate shape of the swirler vanes 72 improves the mixing of the combustion air 36 and fuel 40 by increasing the turbulence of the combustion air 36 entering into the swirler housing 65 through the air passages 74 over prior art circular swirler vanes. Additionally, the ovate shape of the swirler vanes 72 allow the combustion air 36 to be distributed in a more preferential arrangement, such as homogenously, throughout the combustion chamber 53, which will improve the mixing of the air 36 and fuel 40. The improvement to the air-fuel mixing is amplified by the ovate shape of the proximal end 78 of the swirler 64, which provides a larger space for the air-fuel mixing to take place and allows the air-fuel mixture to reach a more preferential distribution, such as a homogenous distribution, than in a strictly circular swirler. The ovate shape of the distal end 80 of the swirler 64 allows for a more homogenous spread of the air-fuel mixture in the combustion chamber 53. This homogenous spread of the air-fuel mixture may be particularly beneficial in an annular combustor 34, which due to the geometry of the combustor 34, typically cannot achieve the same air-fuel spread with a circular swirler 34.

Figure 7:
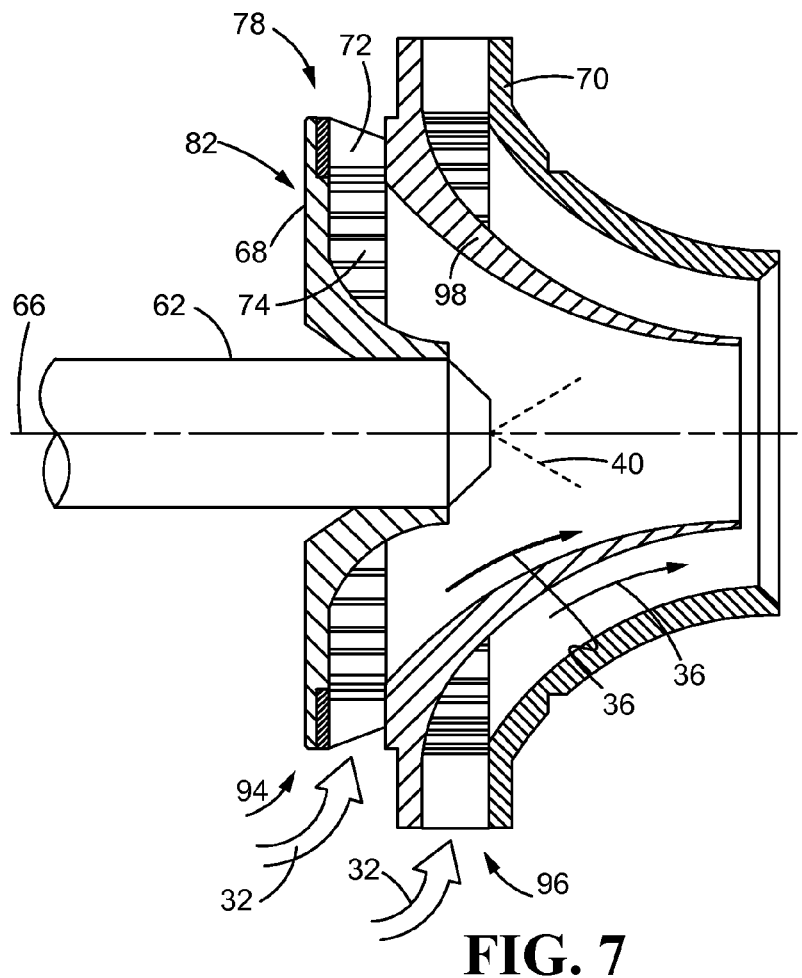
FIG. 7 is a cross-sectional view of a double swirler constructed in accordance with the present disclosure.

In one exemplary embodiment presented in FIG. 7, a first swirler 94 is positioned around the fuel injector 62 as described above and a second swirler 96 is positioned radially outward from the first swirler 94. In such an arrangement, the outer shroud 70 of the first swirler 94 and the inner shroud 68 of the second swirler 96 may be joined to create an inner cone 98.

Figure 8:
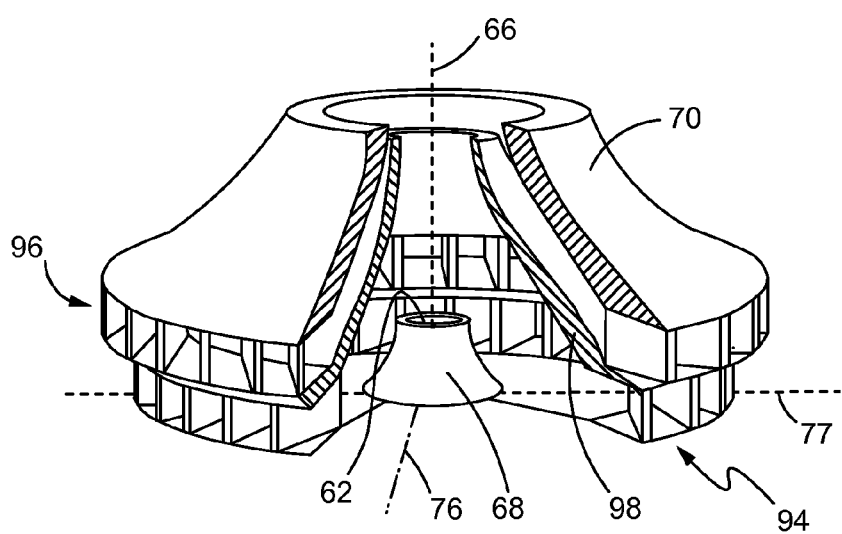
FIG. 8 a perspective, partial cut-away, view of a double swirler constructed in accordance with the present disclosure and detailing a mixture of circular and ovate swirlers.

In another dual-swirler assembly presented in FIG. 8, it can be seen that one or both of the swirlers 94 and 96 may have an ovate shape. In the embodiment presented, the inner swirler 94 and inner shroud 68 have a circular shape while the second swirler 96, inner cone 98, and outer shroud 70 have an ovate shape. However, any combination of ovate and circular shapes may be present in each swirler 94 and 96.

While the presented description has been in reference to a center-body fuel nozzle 53 of a fuel injector 62, alternate arrangements of fuel injection systems are possible, such as but not limited to fuel injection outboard of the swirler 64 or fuel injection within a swirler assembly 100. One such embodiment is presented in FIG. 9, wherein the fuel injector 62 has a central nozzle 53 as well as a plurality of fuel injection holes 102 positioned annularly around the fuel injector 62 and through a second inner wall 104 of the swirler assembly 100. The second inner wall 104 is positioned between a second axial wall 106 and the inner cone 98 of the swirler assembly 100.

Figure 9:
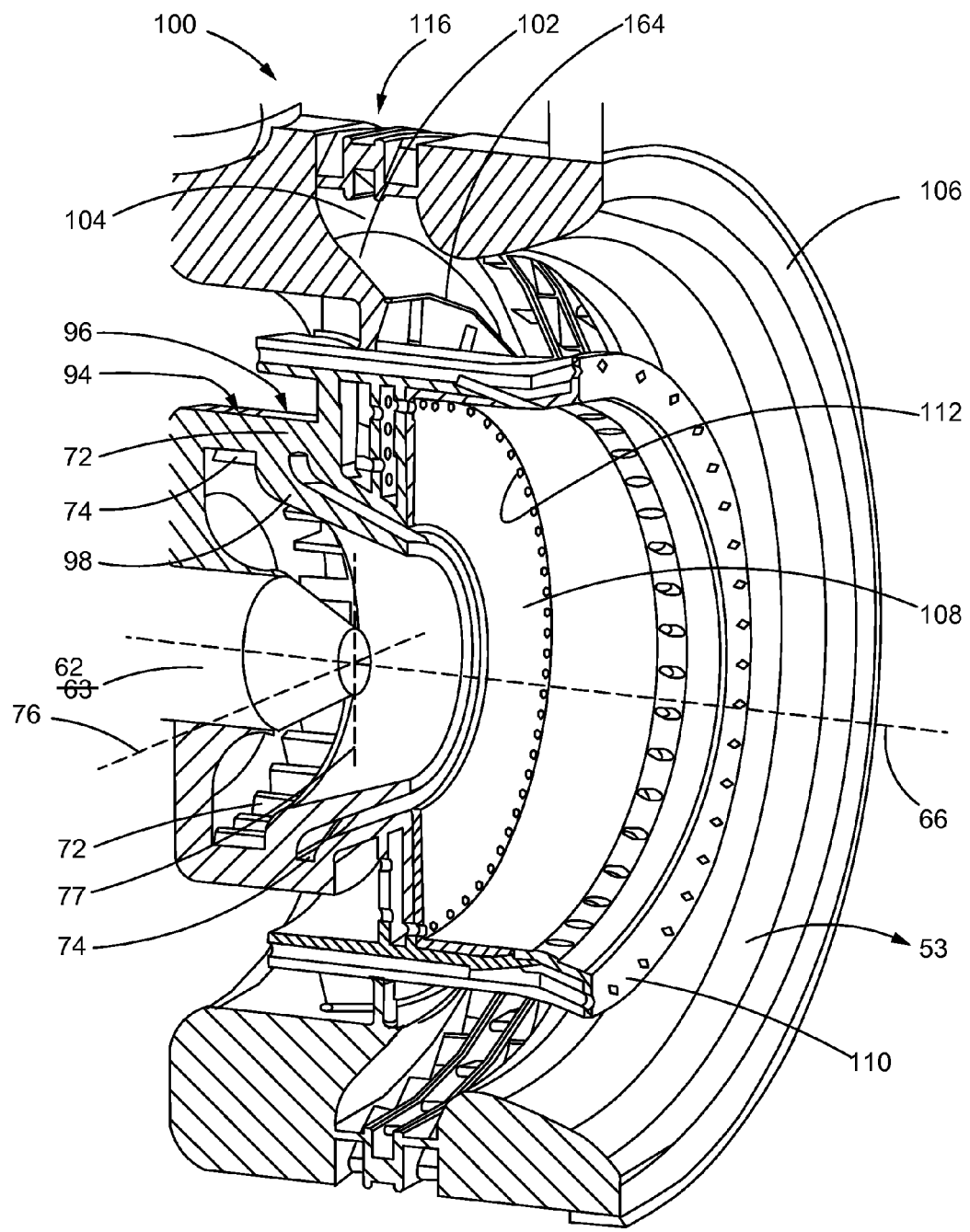
FIG. 9 is a perspective cross-sectional view of a swirler assembly constructed in accordance with the present disclosure.

The swirler assembly 100 of FIG. 9 also provides an exemplary embodiment of a multi-swirler assembly where a first swirler 94 is positioned around the central fuel nozzle 53 and a second swirler 96 is positioned radially surrounding the first swirler 94 with an inner cone 98 separating the two swirlers 94 and 96. Both the first and second swirlers 94 and 96 have an ovate shape as well as the inner shroud 68 and inner cone 98. Radially surrounding the second swirler 96 is a first inner wall 108 which is also of an ovate shape. A first axial wall 110 extends axially from an outer radial edge 112 of the first inner wall 108. The first axial wall 110 also defines an ovate shape around the swirler axis 66 and along the radial line 77. A second axial wall 106 is positioned radially outwards from and surrounding the first axial wall 110. The axial walls 106 and 110 are connected by the second inner wall 104. An ovate axial swirler 114 is disposed through the second inner wall 104. Additionally a plurality of ovate radial swirlers 116 are disposed through the second axial wall 106 near the second inner wall 104.

Alternate configurations of a swirler assembly 100 are possible, wherein the assembly 100 may include any number of swirlers 64, each swirler 64 may be ovate, circular shaped, or a mixture of ovate and circular shapes. The defining walls of the swirler assembly 100, while shown as ovate in FIG. 9, may be either ovate shaped or circular as desired. Any known fuel injection system may also be included in the swirler assembly 100.

INDUSTRIAL APPLICABILITY

From the foregoing, it can be seen that the ovate swirler disclosed herein has industrial applicability in a variety of settings such as, but not limited to mixing air and fuel in a combustion chamber of a gas turbine engine. The gas turbine engine may be utilized in conjunction with an aircraft for generating power and thrust or in land based systems for generating power. Using the teachings of the present disclosure, an ovate swirler may be constructed to create turbulence and alter the air distribution in a combustion chamber, and more specifically in an annular combustion chamber. This ovate shape of the swirler may increase the effectiveness of the turbulence created for mixing the air and fuel injected into the combustion chamber as well as distribute the air into the combustion chamber in a more preferential arrangement. The ovate swirler may also allow for the mixture to reach a preferential mix before entering into the combustion chamber.

There are, thus, several key benefits of this invention. First, the asymmetry introduced by the geometry of the swirler can provide an enhanced flow field (velocity, turbulence, shear, circulation) for mixing with the fuel introduced to the combustor which is critical to emissions and reducing fueling complexity. The ovate geometry can provide preferential fuel-air distributions to the downstream combustor section to assist with mixing with other air sources (cooling, dilution, trim) and fuel-air mixtures from adjacent fuel nozzle-air swirler assemblies. This can positively impact the ability to get optimal fuel-air in the vicinity of igniters and combustor exit temperatures and patterns (e.g. pattern and profile factors). Finally, an ovate assembly permits a higher-count fuel nozzle arrangement in a combustor of given mean radius. Though this could add cost and weight, it can permit less fuel injection per nozzle and better count coupling with the downstream turbine stage.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all embodiments falling within the scope of the claims.

What is claimed is:

1. A swirler comprising:
   an outer shroud and an inner shroud, the outer shroud and the inner shroud each having a proximal end and a distal end, the inner shroud having a smoothly extending transitional wall configured to operatively associate with a fuel injector, the inner shroud positioned radially inside the outer shroud;

a plurality of vanes extending axially between the inner shroud and the outer shroud;

wherein a horizontal centerline of the swirler extends parallel to an inner shell and an outer shell of a combustor, wherein a vertical axis of the swirler extends perpendicular to the horizontal centerline from the inner shell to the outer shell, and wherein at least one of:

the respective proximal ends of the inner shroud and the outer shroud each have a major diameter parallel to the vertical axis and a minor diameter parallel to the horizontal centerline, wherein the major diameter is larger than the minor diameter thereby defining respective ovate proximal ends; or the respective distal ends of the inner shroud and the outer shroud each have a major diameter parallel to the vertical axis and a minor diameter parallel to the horizontal centerline, wherein the major diameter is larger than the minor diameter thereby defining respective ovate distal ends.

2. The swirler of claim 1, wherein the plurality of vanes are positioned in an ovate shaped arrangement.

3. The swirler of claim 1, wherein the swirler has said respective ovate proximal ends, and the respective distal ends of the inner shroud and the outer shroud are circular shaped.

4. The swirler of claim 1, wherein the swirler has said respective ovate distal ends, and the proximal ends are circular shaped.

5. The swirler of claim 1, further including a secondary outer shroud having a proximal end and a distal end, the secondary outer shroud positioned around the outer shroud.

6. The swirler of claim 5, wherein at least one of the respective proximal and distal ends of the secondary outer shroud is ovate shaped.

7. The swirler of claim 1, wherein the swirler is a component of a swirler assembly.

8. A gas turbine engine, comprising:
a compressor;
a combustor axially behind the compressor and having at least one swirler positioned through a forward bulkhead;
a turbine axially behind the combustor and connected to the compressor by a rotatable shaft, and
each swirler including: a plurality of vanes, an outer shroud, and an inner shroud, said outer shroud and said inner shroud each having a proximal end and a distal end, said inner shroud having a smoothly extending transitional wall configured to operatively associate with a fuel injector, said inner shroud positioned radially inside said outer shroud, said plurality of vanes extending axially between said inner shroud and said outer shroud, and each swirler further comprising a horizontal centerline extending parallel to an inner shell and an outer shell of the combustor, and a vertical axis extending perpendicular to the horizontal centerline from the inner shell to the outer shell, wherein for each swirler at least one of:

the respective proximal ends of the inner shroud and the outer shroud each have a major diameter parallel to the vertical axis and a minor diameter parallel to the horizontal centerline, wherein the major diameter is larger than the minor diameter thereby defining respective ovate proximal ends, or the respective distal ends of the inner shroud and the outer shroud each have a major diameter parallel to the vertical axis and a minor diameter parallel to the horizontal centerline, wherein the major diameter is larger than the minor diameter thereby defining respective ovate distal ends.

9. The gas turbine engine of claim 8, wherein the plurality of vanes are positioned in an ovate shaped arrangement.

10. The gas turbine engine of claim 8, wherein each swirler has said respective ovate proximal ends, and the respective distal ends of the inner shroud and the outer shroud of each swirler are circular shaped.

11. The gas turbine engine of claim 8, wherein each swirler has said respective ovate distal ends, and the respective proximal ends of the inner shroud and the outer shroud of each swirler are circular shaped.

12. The gas turbine engine of claim 8, wherein the combustor has an annular shape.

13. The gas turbine engine of claim 12, wherein each outer shroud is symmetrical about the vertical axis.

14. The gas turbine engine of claim 8, each swirler further comprising an ovate shaped secondary outer shroud radially surrounding said outer shroud.

15. The gas turbine engine of claim 8, wherein the at least one swirler is a component of a swirler assembly.

16. A method of mixing air and fuel with the swirler according to claim 1, comprising:
injecting fuel into the swirler by a fuel injection system; and
creating a mixing turbulence with air flowing through a plurality of air passages between the plurality of vanes of the swirler thereby creating an air-fuel mixture in the swirler, the plurality of vanes being arranged in an ovate shape.

17. The method of claim 16, further comprising providing a premixing of the air and fuel within the swirler wherein the swirler has said respective ovate proximal ends.

18. The method of claim 16, further comprising dispersing the air-fuel mixture into a combustion chamber in an air-fuel flow distribution by the swirler, wherein the swirler has said respective ovate distal ends.

* * * * *